US010584248B2

(12) United States Patent
Hamabe et al.

(10) Patent No.: US 10,584,248 B2
(45) Date of Patent: Mar. 10, 2020

(54) COMPOSITE RESIN MOLDED ARTICLE

(71) Applicant: Panasonic Corporation, Osaka (JP)

(72) Inventors: Masashi Hamabe, Osaka (JP);
Toshifumi Nagino, Osaka (JP); Takao Kuromiya, Osaka (JP); Masayoshi Imanishi, Osaka (JP); Shouma Nishino, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/184,071

(22) Filed: Nov. 8, 2018

(65) Prior Publication Data
US 2019/0144675 A1 May 16, 2019

(30) Foreign Application Priority Data
Nov. 10, 2017 (JP) ................. 2017-216844

(51) Int. Cl.
| | |
|---|---|
| *C08L 97/02* | (2006.01) |
| *B29B 7/90* | (2006.01) |
| *B29C 45/00* | (2006.01) |
| *B29B 9/14* | (2006.01) |
| *C08J 5/04* | (2006.01) |
| *C08K 7/02* | (2006.01) |
| *B29K 311/12* | (2006.01) |
| *B29K 23/00* | (2006.01) |
| *C08L 23/12* | (2006.01) |

(52) U.S. Cl.
CPC ............. *C08L 97/02* (2013.01); *B29B 7/90* (2013.01); *B29B 9/14* (2013.01); *B29C 45/0001* (2013.01); *B29C 45/0005* (2013.01); *C08J 5/045* (2013.01); *C08K 7/02* (2013.01); *B29K 2023/12* (2013.01); *B29K 2311/12* (2013.01); *C08J 2323/12* (2013.01); *C08K 2201/003* (2013.01); *C08K 2201/004* (2013.01); *C08L 23/12* (2013.01)

(58) Field of Classification Search
CPC .. C08L 97/02; B29B 7/90; B29B 9/14; B29K 2023/12; B29C 40/005; B29C 45/0001
See application file for complete search history.

(56) References Cited

U.S. PATENT DOCUMENTS

2007/0284366 A1* 12/2007 Ohta .................... H01L 23/373
219/553
2013/0323495 A1   12/2013 Kajiwara et al.
(Continued)

FOREIGN PATENT DOCUMENTS

| EP | 3 251 813 | 12/2017 |
|---|---|---|
| EP | 3 251 813 A1 * | 12/2017 |

(Continued)

OTHER PUBLICATIONS

Extended European Search Report dated Apr. 1, 2019 in corresponding European Patent Application No. 18205187.0.
(Continued)

*Primary Examiner* — Robert D Harlan
(74) *Attorney, Agent, or Firm* — Wenderoth, Lind & Ponack, L.L.P.

(57) ABSTRACT

A composite resin molded article including: a base resin; and a fibrous filler, wherein the fibrous filler is bent between one end side thereof and another end side thereof, and wherein the angle of the bending is 90 degrees or larger.

8 Claims, 5 Drawing Sheets

(56) References Cited

U.S. PATENT DOCUMENTS

2014/0147620 A1   5/2014  Li et al.
2016/0319088 A1  11/2016  Saji
2018/0037737 A1   2/2018  Semba et al.

FOREIGN PATENT DOCUMENTS

| EP | 3 351 587    | 7/2018  |
|----|--------------|---------|
| JP | 2011-207048  | 10/2011 |
| JP | 5577176      | 8/2014  |
| JP | 2017-025338  | 2/2017  |
| JP | 2017-105865  | 6/2017  |
| WO | 2012/114829  | 8/2012  |
| WO | 2015/141742  | 9/2015  |

OTHER PUBLICATIONS

Drach et al., "Effect of a curved fiber on the overall material stiffness", International Journal of Solids and Structures, vol. 100, No. 23, pp. 211-222, 2016.

* cited by examiner

Fig. 5

Table 1

| | Material Properties of Molded Article | | | | | | Mechanical Properties of Molded Article | |
|---|---|---|---|---|---|---|---|---|
| | Fiber Diameter Ratio in One Fiber Minimal Diameter/Maximal Diameter | Bending Angle of Fiber | Aspect Ratio | Length Ratio of Fibrillated Portion | Vacancy Rate around Fiber | | Elastic Modulus GPa | Drop Impact Test |
| Example 1 | About 1/2 | Right angle or larger | 100 to 200 | 20 to 30% | About 5% | | 2.2GPa ○ | ○ |
| Example 2 | About 1/100 | Right angle or larger | 5 to 20 | 5 to 10% | About 5% | | 2.2GPa ○ | ○ |
| Example 3 | About 1/2 | Right angle or larger | 900 to 1000 | 40 to 50% | About 5% | | 2.2GPa ○ | ○ |
| Example 4 | About 1/2 | Right angle or larger | 100 to 200 | 20 to 30% | About 0.005% | | 2.1GPa ○ | △ |
| Example 5 | About 1/600 | Right angle or larger | 5 to 20 | 5 to 10% | About 5% | | 1.8GPa △ | × |
| Example 6 | About 1/2 | Right angle or larger | 100 to 200 | 0 to 4% | About 5% | | 1.7GPa × | △ |
| Example 7 | About 1/2 | Right angle or larger | 100 to 200 | 80 to 100% | About 5% | | 2.1GPa ○ | × |
| Example 8 | About 1/2 | Right angle or larger | 1 to 2 | 5 to 10% | About 5% | | 1.7GPa × | × |
| Example 9 | About 1/2 | Right angle or larger | 1000 to 2000 | 40 to 50% | About 5% | | 2.2GPa ○ | × |
| Example 10 | About 1/2 | Right angle or larger | 100 to 200 | 20 to 30% | About 70% | | 1.8GPa △ | ○ |
| Comparative Example 1 | About 3/4 | 30 to 60 degrees | 100 to 200 | 20 to 30% | About 5% | | 2.2GPa ○ | × |
| Comparative Example 2 | About 1/2 | 60 to 80 degrees | 100 to 200 | 20 to 30% | About 5% | | 2.1GPa ○ | × |

COMPOSITE RESIN MOLDED ARTICLE

CROSS-REFERENCE TO RELATED APPLICATIONS

This application claims priority of Japanese Patent Application No. 2017-216844 filed on Nov. 10, 2017, the contents of which is incorporated herein by reference.

BACKGROUND OF THE INVENTION (1) Field of the Invention

The present disclosure relates to a composite resin molded article and, more particularly, to a composite resin molded article excellent in especially the mechanical properties.

(2) Description of the Related Art

What-is-called "general-purpose plastics" such as polyethylene (PE), polypropylene (PP), polystyrene (PS), and polyvinyl chloride (PVC) each not only is very inexpensive but also is easily used for molding and is lightweight to have a weight of one several-th of the weight of a metal or a ceramic in a comparison therebetween. The general-purpose plastics are therefore each often used as a material of a variety of livingware such as a bag, various packages, various containers, and sheets and as a material of industrial parts such as automobile parts and electric parts, daily-use articles, and general merchandizes.

The general-purpose plastics however each have disadvantages such as insufficient mechanical properties. The current situation is therefore that the general-purpose plastics each do not have sufficient properties that are required to the materials used in various industrial products including mechanical products such as automobiles, and electric, electronic, and information-related products and the range of their application is limited.

On the other hand, what-is-called "engineering plastics" such as polycarbonates, fluorine resins, acrylic resins, and polyamides are each excellent in the mechanical properties and are used in various industrial products including mechanical products such as automobiles, and electric, electronic, and information-related products. Engineering plastics are however each expensive, and each arise a problem that recycling of monomers thereof is difficult and a load thereby on the environment is heavy.

It is therefore demanded to significantly improve the material properties of each of the general-purpose plastics (such as the mechanical strength). A technique is known according to which the mechanical strength of a general-purpose plastic is improved by dispersing a natural fiber, a glass fiber, a carbon fiber, or the like to be a fibrous filler in the resin of the general-purpose plastic for strengthening the general-purpose plastic. Above all, organic fibrous fillers such as cellulose are inexpensive and are also excellent in the environment-friendliness at the time of their disposal, and therefore each attract attention as a strengthening fiber (see, e.g., Japanese Patent Publication No. 5577176).

Each company is advancing studies to improve the mechanical strength of each of the general-purpose plastics and, in the '176 publication, the elastic modulus is increased and the dimensional stability is improved by adding a cellulose fiber whose maximal fiber diameter is 100 nm or smaller and whose aspect ratio is 2,000 or larger.

SUMMARY

In the '176 publication, however, the fiber whose aspect ratio is 2,000 or larger is added and, as depicted in FIGS. 4A and 4B, the fibrous filler 2 tends to be oriented in the flow direction of a base resin 1 in a melted state that is injected when molding is conducted. The strength in the direction perpendicular to the flow direction is low and a problem arises that especially the surface impact strength is degraded.

A composite resin molded article of the present disclosure solves the traditional problem and provides a composite resin molded material that has a high elastic modulus and high impact resistance.

One non-limiting and exemplary embodiment provides a composite resin molded article that includes a base resin and a fibrous filler and is characterized in that the fibrous filler is bent between one end side thereof and another end side thereof and the bend angle is 90 or more degrees.

The composite resin molded article of the present disclosure can realize a composite resin molded article that has a high elastic modulus and high impact resistance.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF THE DRAWINGS

The present disclosure will become readily understood from the following description of non-limiting and exemplary embodiments thereof made with reference to the accompanying drawings, in which like parts are designated by like reference numeral and in which:

FIG. 5 is Table 1 of the measurement results for Examples 1 to 10 and Comparative Examples 1 and 2.

DETAILED DESCRIPTION

Figure 1A:
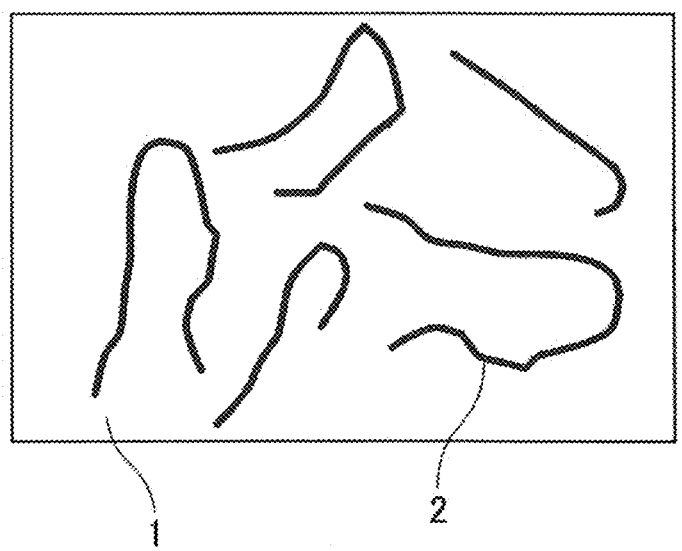
FIG. 1A is a schematic cross-sectional diagram of a composite resin molded article in an embodiment of the present disclosure.
Figure 1B:
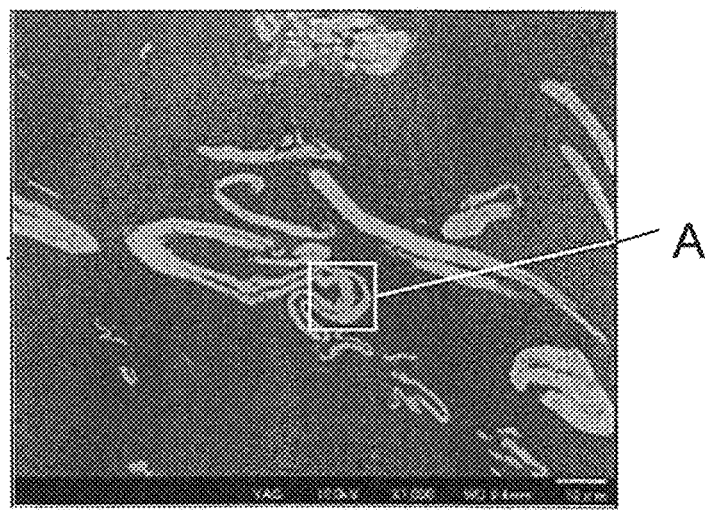
FIG. 1B is a SEM photograph of the cross-section of a composite molded article.
Figure 1C:
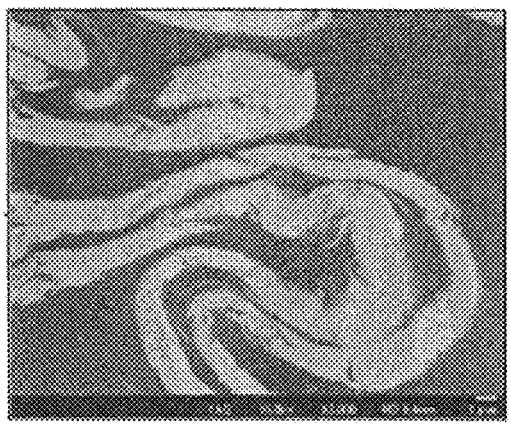
FIG. 1C is a partial enlarged drawing of portion "A" of FIG. 1B.

A composite resin molded article in an embodiment of the present disclosure will be described below with reference to the drawings. In the following description, same components are given the same reference numerals and will properly not described repeatedly.

The composite resin molded article in the embodiment of the present disclosure is acquired from a melted and kneaded substance that includes a base resin, and a fibrous filler. Further, the composite resin molded article may include a dispersing agent as an option. As depicted in a schematic cross-sectional diagram of FIG. 1A, the composite resin molded article has therein the fibrous filler 2 dispersed in the base resin 1.

In this embodiment, to secure excellent moldability, for example, the base resin 1 may be a thermoplastic resin.

Examples of the thermoplastic resin include olefin-based resins (including cyclic olefin-based resins), styrene-based resins, (meth)acrylic resins, organic acid-vinyl ester resins or their derivatives, vinyl ether-based resins, halogen-containing resins, polycarbonate-based resins, polyester-based resins, polyamide-based resins, thermoplastic polyurethane resins, polysulphone-based resins (such as polyethersulphone and polysulphone), polyphenylene ether-based resins (such as a polymer of 2,6-xylenol), cellulose derivatives (such as cellulose esters, cellulose carbamates, and cellulose ethers), silicone resins (such as polydimethylsiloxane and polymethylphenylsiloxane), and rubbers or elastomers (such as diene-based rubbers such as polybutadiene and polyisoprene; styrene-butadiene copolymers; acrylonitrile-butadiene copolymers; acrylic rubbers; urethane rubbers; and silicone rubbers). Any one of these resins may be used alone, or two or more thereof may be used in combination. The base resin 1 is not limited to these materials only when the base resin 1 has thermoplasticity.

For example, the base resin 1 may be the olefin-based resin that has a relatively low melting point, of the above thermoplastic resins. In addition to homopolymers of the olefin-based monomers, examples of the olefin-based resin include copolymers of the olefin-based monomers, and copolymers each of the olefin-based monomer and another copolymerizable monomer. Examples of the olefin-based monomer include, for example, chain olefins (such as α-C2-20 olefins such as ethylene, propylene, 1-butene, isobutene, 1-pentene, 4-methyl-1-pentene, and 1-octene), and cyclic olefins. Any one of these olefin-based monomers may be used alone, or two or more thereof may be used in combination. Of the above olefin-based monomers, the chain olefins such as ethylene and propylene are advantageously used. Examples of the other copolymerizable monomer include, for example, fatty acid-vinyl esters such as vinyl acetate and vinyl propionate; (meth)acrylic monomers such as (meth)acrylic acid, alkyl(meth)acrylate, and glycidyl (meth)acrylate; unsaturated dicarboxylic acids such as maleic acid, fumaric acid, maleic acid anhydride, or their anhydrides; vinyl esters of carboxylic acids (such as, for example, vinyl acetate and vinyl propionate); cyclic olefins such as norbornene and cyclopentadiene; and dienes such as butadiene and isoprene. Any one of these copolymerizable monomers may be used alone, or two or more thereof may be used in combination. Specific examples of the olefin-based resin include polyethylene (such as low-density, intermediate-density, high-density, or linear low-density polyethylene), and copolymers of chain olefins (especially, α-C2-4 olefins) such as polypropylene, ethylene-propylene copolymers, and terpolymers such as ethylene-propylene-butene-1.

The dispersing agent will be described. The composite resin molded article in this embodiment may include the dispersion agent as an option for improving the adhesiveness between the fibrous filler 2 and the base resin 1 or for improving the dispersiveness of the fibrous filler 2 in the base resin 1, or the like. Examples of the dispersing agent include various types of titanate-based coupling agent; silane coupling agents; modified polyolefins each grafted with an unsaturated carboxylic acid, maleic acid, or maleic acid anhydride; fatty acids; metallic salts of fatty acids; and fatty acid esters. An unsaturated hydrocarbon-based or an epoxy-based silane coupling agent is advantageously used as the silane coupling agent. No problem arises even when denaturing treatment is conducted for the surface of the dispersing agent using a thermosetting or thermoplastic polymer component. The content of the dispersing agent in the composite resin molded article of this embodiment is preferably 0.01% by mass to 20% by mass, more preferably 0.1% by mass to 10% by mass, and further preferably 0.5% by mass to 5% by mass. When the content of the dispersion agent is less than 0.01% by mass, defective dispersion may occur and, on the other hand, when the content of the dispersing agent exceeds 20% by mass, the strength of the composite resin molded article may be degraded. The dispersing agent is properly selected based on the combination of the base resin 1 and the fibrous filler 2, and does not need to be added for the combination that does not need any dispersing agent.

The fibrous filler 2 will be described. The fibrous filler 2 included in the composite resin molded article in this embodiment (hereinafter, may be referred to simply as "fiber") is used in the composite resin molded article for improving mainly the mechanical properties and the dimensional stability by reducing the linear expansion coefficient. For these improving, for example, the fibrous filler 2 may have a higher elastic modulus than that of the base resin 1. Examples of the fibrous filler 2 include, for example, carbon fiber (carbonaceous fiber); carbon nano-tubes; pulp; cellulose; cellulose nano-fiber; lignocellulose; lignocellulose nano-fiber; basic magnesium sulfate fiber (magnesium oxysulfate fiber); potassium titanate fiber; aluminum borate fiber; calcium silicate fiber; calcium carbonate fiber; silicon carbide fiber; wollastonite; zonotlite; various types of metal fiber; natural fiber such as cotton, silk, wool, or hemp; jute fiber; regenerated fiber such as rayon or cupra; semisynthetic fibers such as acetate and promix; synthetic fibers such as polyester, polyacrylonitrile, polyamide, and polyolefin; and modified fibers acquired by conducting chemical modification for the surface and ends of each of these. Among these, the carbons and the celluloses are especially advantageously used from the viewpoints of the availability, the high elastic modulus, and the low linear expansion coefficient. The natural fibers of the celluloses are advantageously be used from the viewpoint of the environment-friendliness.

Figure 2A:
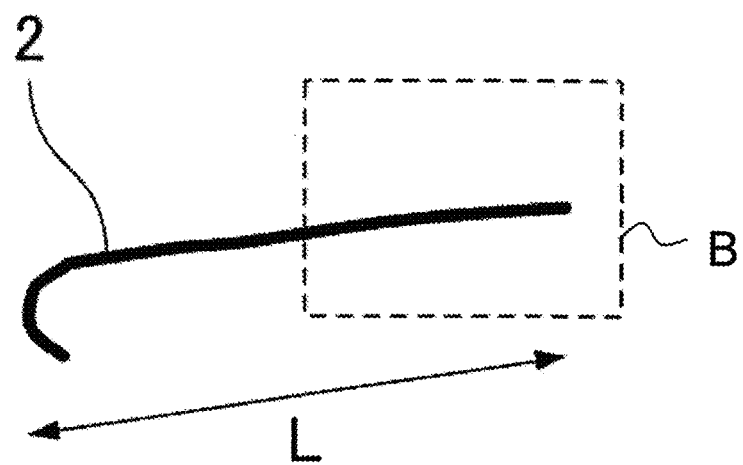
FIG. 2A is a schematic diagram of a fibrous filler in the embodiment of the present disclosure.

The shape of the fibrous filler 2 will be described. In FIG. 2A, a letter "L" denotes the length of the fibrous filler 2 (hereinafter, may be referred to as "fiber length") and, in FIG. 2B, a letter "d" denotes the width of the fibrous filler 2 (hereinafter, may be referred to as "fiber diameter"). When the aspect ratio of the fibrous filler 2 (L/d) is great, the fibrous filler tends to be oriented in the flow direction when injection molding is executed and the strength in the orientation direction of the fibrous filler becomes strong while the strength in the direction perpendicular to the orientation direction becomes weak. As a result, the impact strength determined at a drop test or the like is degraded. Therefore, for example, the aspect ratio (L/d) may be small, that is, the fiber diameter d be large as the overall fibrous fiber. Small aspect ratio causes the fibrous filler 2 to tend to be bent when the injection molding is conducted and, as a result, the impact strength is improved.

To cause the fibrous filler 2 to have the form of being bent between the one end side thereof and the other end side thereof, for example, a point at which the fiber is thick and a point at which the fiber is thin be present in one piece of fibrous filler. For example, the fiber diameter differ along the longitudinal direction of the fibrous filler. The resistance received in the flow of the melted resin when the injection molding is conducted differs between the thick point and the thin point and, as a result, the thin point becomes a bending portion in which the fiber is curved or the like at 90 or more degrees, and the fiber can be oriented in a random direction. In the present disclosure, "bending" refers to a concept that includes a curved form, a bent form, and the like. In the present disclosure, the angle of the bending may be referred to as "bending angle" or "bent angle" or "bend angle". In other words, in the present disclosure, the bending angle can be defined as the angle of the bending generated between the one end side and the other end side of the used fibrous filler. That is, the "bending angle" may be defined as an angle between an elongating direction before bending and an elongating direction after bending. Otherwise, the "bending angle" may be defined as an angle in the center of curvature between a radius of curvature before bending and a radius of curvature after bending. The impact strength of the molded article including the fibrous filler is improved by the presence of this bending portion. For example, in the case where the fibrous filler is acquired from wood, the fiber having the thick point and the thin point present therein along the length direction thereof can be produced by applying a strong shear stress by narrowing the set gap of a beater such as a refiner when the beating step of fiberizing the wood is conducted. Otherwise, any fiber in this form can be selected from the natural fibers and can be used.

The inventors have calculated what relation present between the thick portion and the thin portion of one piece of fibrous filler causes the fibrous filler to tend to receive the resistance in the melted resin liquid to tend to be bent based on a simulation conducted by the inventors. According to the calculation, for example, the fiber diameter of the thinnest portion be 2/3 or smaller of the fiber diameter of the thickest portion. When the fiber diameter is excessively small, however, no sufficient tensile strength can be secured at the thinnest point and breakage occurs when the injection molding is conducted. The inventors have calculated the relation of the fiber diameters without any breakage of the fiber occurring when the injection molding is conducted based on the simulation conducted by the inventors. For example, the fiber diameter of the thinnest portion be 1/500 or larger of the fiber diameter of the thickest portion.

A difference in the flow velocity is generated between the thick portion and the thin portion when the injection molding is conducted and the fiber tends to be bent by the presence of the thick portion and the thin portion in the one piece of fibrous filler while the fiber tends to be bent especially in the thin portion. The fiber tends to be bent at 90 or more degrees, that is, at an angle of the right angle or larger in the thinnest portion. The aspect of the "bending" used herein is as follows. Examples of the aspect include, for example, a fibrous filler that is curved in a U-shape, a J-shape, a C-shape, or a Q-shape. The examples also include the fibrous filler that is bent in a V-shape or an N-shape and the fibrous fillers that each have another form.

The principle will be described for the improvement of the impact resistance by the bending of the fibrous filler at 90 or more degrees, that is, at an angle of the right angle or larger. When an impact is applied, the resin is deformed in a radial fashion in the tensile direction from the impact application point. In this case, when the fiber is not bent at an angle of the right angle or larger, the fiber cannot follow the stretching of the resin and a stress concentrates on the interface between the resin and the fiber to generate cracks resulting in splitting. On the other hand, in the case where the fiber is bent at an angle of the right angle or larger, the bent portion moves in the direction for the bent portion to be opened when the impact is applied. The fiber can thereby follow the stretching of the resin and no stress concentrates. The impact resistance is therefore improved by the fact that the fiber has the structure that is bent at an angle of the right angle or larger. In addition, these fibers are not oriented and are three-dimensionally present in random directions, and the molded article is thereby strengthened for impacts from all the directions.

Figure 2B:
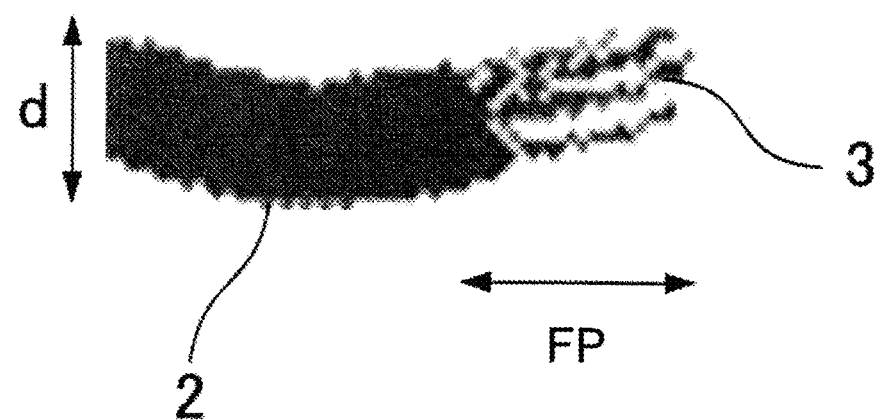
FIG. 2B is a partial enlarged drawing of portion "B" of FIG. 2A.

Though the description has been made from the viewpoint of the impact strength, on the other hand, from the view point of other mechanical properties, a larger joint interface between the fiber and the resin leads to more improved elastic modulus. Therefore, for example, the specific surface area of the fiber be large, that is, the fiber diameter d be small. To achieve the two features of the small aspect ratio and the large specific surface area, as depicted in FIG. 2B, a structure for one piece of fibrous filler to have end portions in the fiber length direction to partially be fibrillated therein is most advantageously employed. A reference numeral "3" denotes a fibrillated portion. The optimal shape of the fiber has been calculated as follows from the result of experiments and simulations conducted by the inventors. The fibrillated portion 3 has the length "FP" that is preferably 5% to 50% of the fiber length L of the overall fibrous filler 2. When the length "FP" of the fibrillated portion 3 is less than 5% of the over all fiber length L, the specific surface area is small and no improvement of the elastic modulus is therefore observed. In contrast, in the case where the length "FP" of the fibrillated portion 3 is 50% or higher, the fibrillated portion 3 having the large aspect ratio is dominant and the orientation therefore tends to occur when the injection molding is executed, and the impact strength is degraded.

The properties of the fibrous filler 2 will be described. The types of each of the base resin 1 and the fibrous filler 2 are as above while, when the fibrous filler 2 is excessively soft relative to the base resin 1, that is, the elastic modulus thereof is excessively small, the composite resin molded article has a small elastic modulus as a whole and, as a result, the strength is degraded. On the other hand, in the case where the fibrous filler 2 is excessively hard relative to the base resin 1, that is, the elastic modulus thereof is excessively large, the impact wave generated at the time of application of an impact is not propagated and is absorbed by the interface between the base resin 1 and the fibrous filler 2. Cracks and crazing therefore tend to be generated in the vicinity of the interface and, as a result, the impact strength is degraded. The elastic modulus of the fibrous filler 2 is higher than that of the base resin and the difference therebetween is advantageously small as far as possible, as the relation between the elastic modulus of the base resin 1 and the elastic modulus of the fibrous filler 2. The optimal relation therebetween has been calculated from the result of the simulation conducted by the inventors and for example, the difference in the elastic modulus between the base resin 1 and the fibrous filler 2 be 20 GPa or smaller.

For improving the adhesiveness for the base resin 1 or the dispersiveness in the composite resin molded article, or the like, the fibrous filler 2 after undergoing surface treatment using any one of such substances may be used, as various types of titanate-based coupling agent; silane coupling agents; modified polyolefins each grafted with an unsaturated carboxylic acid, maleic acid, or maleic acid anhydride; fatty acids; metallic salts of fatty acids; and fatty acid esters. Otherwise, the fibrous filler 2 after undergoing surface treatment using a thermosetting or thermoplastic polymer component arises no problem.

Figure 3:
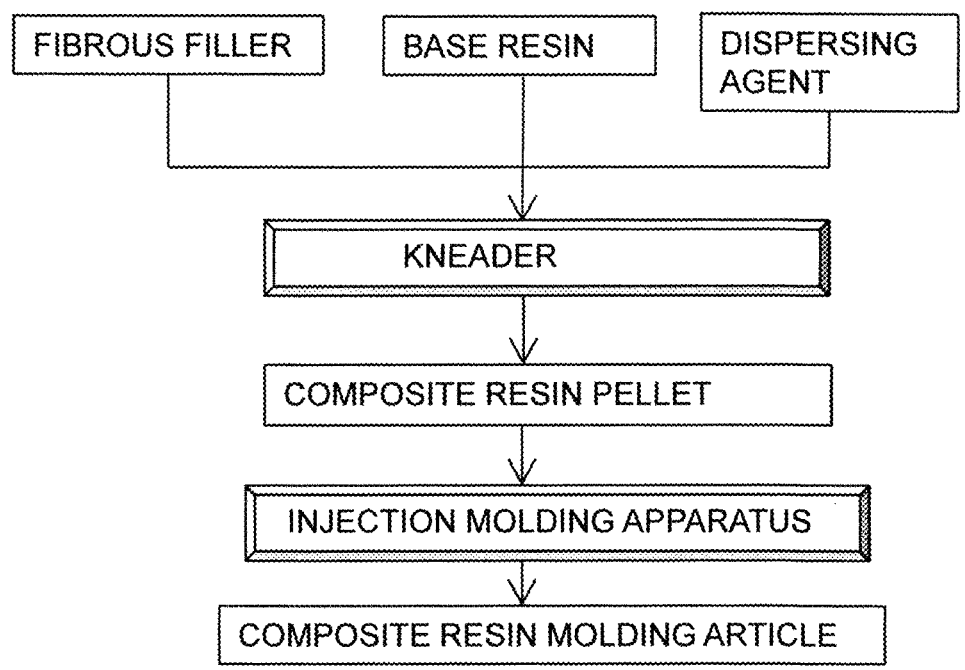
FIG. 3 is a diagram of a production process of the composite resin molded article in the embodiment of the present disclosure.
Figure 4A:
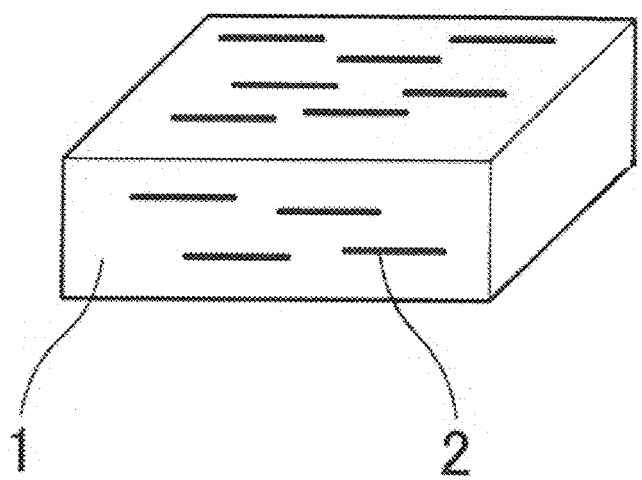
FIG. 4A is a schematic cross-sectional diagram of a composite resin molded article in Japanese Patent Publication No. 5577176.
Figure 4B:
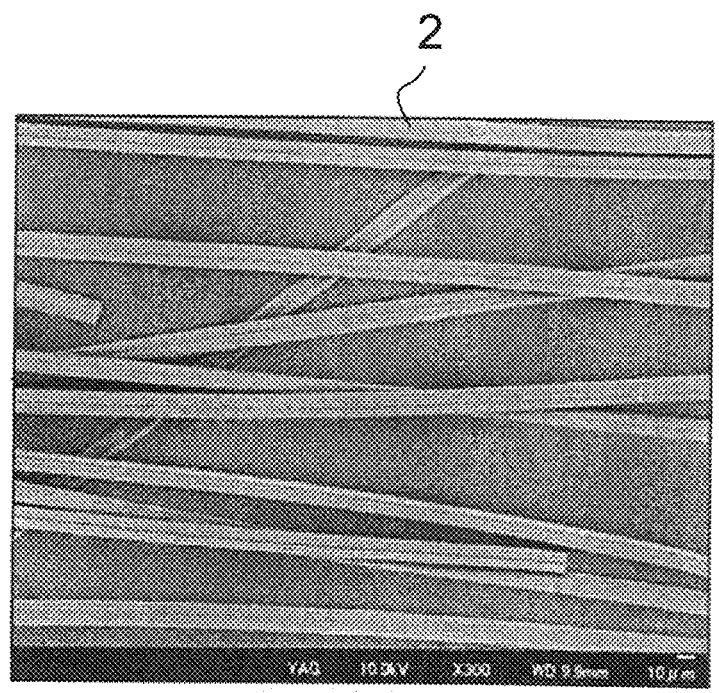
FIG. 4B is a SEM photograph of the cross-section of a composite resin molded article of Japanese Patent Publication No. 5577176.

A production method for a molded article will be described. FIG. 3 is a flowchart of an example of the production process for a composite resin molded article in the embodiment. The base resin, the fibrous filler, and optional the dispersing agent are first put in a melting and kneading processing apparatus and are melted and kneaded in the apparatus. The base resin is thereby melted, and the fibrous filler and the dispersing agent are dispersed in the melted base resin. At the same time, fibrillation of aggregates of the fibrous filler is facilitated by the shearing action of the apparatus and the fibrous filler can finely be dispersed in the base resin.

A fibrous filler whose fiber is fibrillated in advance by a pre-process such as wet dispersion is traditionally used as the fibrous filler. When the fibrous filler is fibrillated in advance in a solution used in the wet dispersion, the fibrous filler is however more easily fibrillated than being fibrillated in the melted base resin, and it is therefore difficult to fibrillate only the end portion resulting in the state where the overall fibrous filler is fibrillated. The number of process steps is increased by adding the pre-process and a problem arises that the productivity is degraded.

In contrast, in the production process for the composite resin molded article in this embodiment, the pre-process using the wet dispersion for conducting the fibrillation treatment and the modification treatment of the fibrous filler is not conducted but a melting and kneading process (a totally dry method) is conducted for the fibrous filler together with the base resin, the dispersing agent, and the like. At this step, only the end portion of the fibrous filler can partially be fibrillated as above by not conducting the wet dispersing process for the fibrous filler. In addition, the number of process steps can be maintained to be small and the productivity can be improved.

To produce the fibrous filler in the above form using the totally dry method, for example, a large shear stress be applied during the kneading. Examples of the specific kneader for this kneading include a single-screw kneader, a twin-screw kneader, a roll kneader, and a Banbury mixer. From the viewpoints of easy application of a large shear and high productivity, a continuous twin-screw kneader and a continuous roll kneader are especially advantageously be used. A kneading approach other than the above may be used only when the kneading approach is a method that enables the application of the high shear stress.

In the totally dry method, the fiber is not denatured in advance and is mixed with the dispersing agent in the melted base resin, and the overall fiber is thereby not denatured. Points having low compatibility with the base resin are therefore partially present and a vacancy is formed at each of these points. When the vacancies are present in the composite resin molded article, the resin and the fiber are incompatible with each other at the points also when the molding of the composite resin molded article is conducted. The vacancies therefore remain as they are. The elastic modulus of the composite resin molded article is somewhat degraded by the vacancies while the impact resistance is improved. For a housing of a home appliance that is especially a housing of a mobile home appliance that is carried about such as a cleaner, crazing generated when the home appliance is dropped is troublesome, and improvement of the impact resistance is therefore more strongly desired than the improvement of the elastic modulus. Therefore, for example, some vacancies be caused to present in the composite resin molded article and the impact resistance thereby be improved. The impact resistance is improved by the presence of the vacancies, because the impact wave propagated in the interface between the base resin and the fibrous filler when an impact is applied is alleviated by the vacancies. The volume of the vacancies has been calculated from the result of the simulation conducted by the inventors and is preferably 10% or lower relative to the volume of the fibrous filler. The impact wave cannot be absorbed and the impact resistance is degraded when the vacancies are each excessively small. The volume of the vacancies has also been calculated from the result of the simulation conducted by the inventors and is preferably 0.01% or larger relative to the volume of the fibrous filler.

The composite resin molded article extruded from the melting and kneading apparatus undergoes a cutting step by a pelletizer or the like and is produced into the shape of pellets. The methods of pelletizing include an air hot-cut method, a water hot-cut method, and a strand-cut method as the methods to each be conducted immediately after the melting the resin. Otherwise, a crushing method or the like is present that is executed by crushing and cutting after a molded article or a sheet is once molded.

An injection-molded article can be produced as the composite resin molded article by injection-molding the pellets. As above, the fiber of the fibrous filler in the pellet tends to avoid orienting in the injection direction and has a structure for the fiber to be bent at an angle of the right angle or larger. An injection-molded article having enhanced impact resistance can therefore be acquired. Examples and Comparative Examples based on the experiments conducted by the inventors will be described.

EXAMPLE 1

Pulp-dispersed polypropylene composite resin molded articles were produced using the following production method.

Polypropylene [PP] (produced by Prime Polymer Co., Ltd., the trade name: J108M) as the base resin, cotton-like softwood pulp (produced by Mitsubishi Paper Mills Ltd., the trade name: NBKP Celgar) as the fibrous filler, and maleic acid anhydride (produced by Sanyo Chemical Industries Ltd., the trade name: Umex) as the dispersing agent were weighed to respectively have the mass ratios of 85:15:5 and were dry-blended with each other. The blended components were thereafter melted and kneaded to be dispersed using a twin-screw kneader (manufactured by Kurimoto Ltd., a KRC kneader). The shear force was able to be varied by changing the screw configuration of the twin-screw kneader, and the specification of an intermediate-shear type was employed in Example 1. The melted resin material was hot-cut to produce pulp-dispersed polypropylene pellets.

Using the produced pulp-dispersed polypropylene pellets, a test piece of a composite resin molded article was produced using an injection-molding machine (manufactured by The Japan Steel Works Ltd., 180AD). The production conditions for the test piece were set for the resin temperature to be 190° C., the mold temperature to be 60° C., the injection velocity to be 60 mm/s, and the dwelling pressure to be 80 Pa. The pellets were bitten by the screws of the molding machine through a hopper while the entering property for this case was measured using the pellet reduction amount per hour and it was confirmed that the entering property was constant. The shape of the test piece was changed in accordance with each of the evaluation items described below to produce a dumbbell having a size No. 1 for measuring the elastic modulus and to produce a flat plate having the lengths each of 60 mm and the thickness of 1.2 mm for a drop impact test. The acquired pulp-dispersed polypropylene composite resin molded article test pieces were evaluated in accordance with the following methods.

(Minimal Diameter/Maximal Diameter to Be Fiber Diameter Ratio of One Piece of Fiber, Bending Angle of Fiber)

A CP process was conducted for the acquired pulp-dispersed polypropylene composite resin molded article and the cross-section was thereby exposed, and the fiber form was observed by SEM observation. Because the flat face was observed by the SEM for the cross-section, the fiber state was three-dimensionally observed by repeating polishing of the cross-section by several μm and observing the polished cross-section, for the depth direction. As the result of measuring about 10 typical fibers, the minimal diameter/the maximal diameter to be the fiber diameter ratio of one fiber was about 1/2. The bending angle of the fiber was an angle of the right angle or larger.

(Aspect Ratio of Portion Not Fibrillated, Rate of Length of Fibrillated Portion)

The acquired pulp-dispersed polypropylene pellets were immersed in a xylene solvent to solve the polypropylene and, for the remaining pulp fiber, the shape of the fiber was observed using an SEM. As a result of the observation for about 10 typical fibers, the fiber diameter was 2 to 10 μm, the fiber length was 200 to 1,000 μm, and the aspect ratio of the portion not fibrillated (hereinafter, may be referred to simply as "aspect ratio") was about 100 to about 200. A fibrillated portion was observed on an end portion in the fiber length direction and the length of the fibrillated portion was about 20 to 30% of the length of the overall fiber.

(Vacancy Rate around Fiber)

Using the SEM observation of the cross-section of the composite resin molded article same as above, the interface between the fiber and the base resin was observed. It was thereby confirmed that the vacancy was present that had the volume of 10% or lower relative to the volume of the fiber.

(Elastic Modulus of Composite Resin Molded Article)

A tensile test was conducted using the acquired test pieces each having the No. 1 dumbbell shape. The test piece whose value of the elastic modulus was less than 1.8 GPa was evaluated as "x", the test piece whose value thereof was 1.8 GPa and less than 2.0 GPa was evaluated as "Δ", and the test piece whose value thereof was larger than 2.0 GPa was evaluated as "o", as the evaluation method for the elastic modulus. The elastic modulus of the test piece was 2.2 GPa and the evaluation thereof was "o".

(Drop Test of Composite Resin Molded Article)

A drop impact test was conducted using the acquired test piece having the flat-plate shape. For example, the test piece was put on an end face of a column-shaped block having a hole whose diameter was 40 mm and that was formed on the end face thereof in the horizontal direction, and a guide was installed on the outer side of the four sides of the test piece to prevent any displacement thereof. A plumb bob having a weight of 250 g was thereafter dropped toward a position in the central portion of the hole in the plate face of the test piece, from a height of 80 cm to check whether any crack was generated. The test piece with no crack recognized was evaluated as "o", the test piece with cracks recognized only on the surface and with the lengths of the cracks being shorter than 10 mm was evaluated as "Δ", and the test piece with a penetrating crack recognized or with the length of the crack being 10 mm or longer was evaluated as "x", as the evaluation method therefor. The test piece had no crack recognized thereon and the evaluation thereof was "o".

EXAMPLE 2

In Example 2, the lot of the pulp was changed to a lot with dispersion that was somewhat larger and the screw configuration was changed to a low-shear type, compared to Example 1. The material conditions and the processing conditions other than the above were set to be same as those of Example 1 to produce pulp-dispersed polypropylene pellets and molded articles. The evaluations were conducted in the same manner as that of Example 1.

EXAMPLE 3

In example 3, the screw configuration was changed to a high-shear type compared to Example 1. The material conditions and the processing conditions other than the above were set to be same as those of Example 1 to produce pulp-dispersed polypropylene pellets and molded articles. The evaluations were conducted in the same manner as that of Example 1.

EXAMPLE 4

In Example 4, the softwood pulp of Example 1 was changed to a pulp fiber that was completely hydrophobically modified by a silane coupling agent in advance and that tended to be compatible with PP to be the base resin. The other conditions other than the above were set to be same as those of Example 1 to produce pulp-dispersed polypropylene pellets and molded articles. The evaluations were conducted in the same manner as that of Example 1.

EXAMPLE 5

In Example 5, the lot of the pulp was changed compared to Example 1. For example, the lot was changed to a lot with a large dispersion, that is, to pulp whose each one fiber had fiber diameter ratios therein that significantly differed from each other. The conditions other than the material of the fibrous filler were set to be same as those of Example 1 to produce pulp-dispersed polypropylene pellets and molded articles. The evaluations were conducted in the same manner as that of Example 1.

EXAMPLE 6

In Example 6, the screw configuration of the injection-molding machine was changed to only a feeding screw that applied substantially no shear, compared to Example 1. The conditions other than the screw configuration were set to be same as those of Example 1 to produce pulp-dispersed polypropylene pellets and molded articles. The evaluations were conducted in the same manner as that of Example 1.

EXAMPLE 7

In Example 7, the screw configuration of the injection-molding machine was changed to a high-shear type, compared to Example 1. The material was caused to pass through the kneader for 10 times. The conditions other than the above were set to be same as those of Example 1 to produce pulp-dispersed polypropylene pellets. The acquired pellets were again put into the kneader to produce the pulp-dispersed polypropylene pellets and the this was repeated to acquire 10 sessions in total of passing through the kneader to produce the pulp-dispersed polypropylene pellets. Using these pellets, the molded articles were produced in the same manner as that of Example 1. The evaluations were conducted in the same manner as that of Example 1.

EXAMPLE 8

In Example 8, the fact that the softwood pulp was crushed in advance into powder was changed compared to Example 1. The conditions other than the above were set to be same as those of Example 1 to produce pulp-dispersed polypropylene pellets and molded articles. The evaluations were conducted in the same manner as that of Example 1.

EXAMPLE 8

In Example 9, the softwood pulp was changed to pulp fiber whose fiber fibrillation was advanced in advance by a wet fibrillation process. The conditions other than the above were set to be same as those of Example 1 to produce pulp-dispersed polypropylene pellets and molded articles. The evaluations were conducted in the same manner as that of Example 1.

EXAMPLE 10

In Example 10, the fact that the maleic acid anhydride as the dispersing agent was not added was changed compared to Example 1. The conditions other than the above were set to be same as those of Example 1 to produce pulp-dispersed polypropylene pellets and molded articles. The evaluations were conducted in the same manner as that of Example 1.

COMPARATIVE EXAMPLE 1

In Comparative Example 1, the lot of the pulp was changed compared to Example 1. For example, the pulp was changed to the pulp whose fiber diameter was substantially uniform, that is, whose fiber diameter ratios had substantially no difference in one fiber. The conditions other than the material of the fibrous filler were set to be same as those of Example 1 to produce pulp-dispersed polypropylene pellets and molded articles. The evaluations were conducted in the same manner as that of Example 1.

COMPARATIVE EXAMPLE 2

In Comparative Example 2, the pressure for the injection molding was increased compared to that of Example 1 for the fiber to tend to be oriented in the flow direction. The conditions other than this molding condition were set to be same as those of Example 1 to produce pulp-dispersed polypropylene pellets and molded articles. The evaluations were conducted in the same manner as that of Example 1.

The measurement results for Examples 1 to 10 and Comparative Examples 1 and 2 are shown in Table 1 of FIG. 5.

As is clear from Table 1, in Example 2 with the lot of the pulp changed to the lot having somewhat large dispersion and with the screw configuration changed to the low-shear type, the minimal diameter/maximal diameter to be the fiber diameter ratio of one fiber was about 1/100. The fiber was therefore not fibrillated sufficiently in the melted resin resulting in the aspect ratio of 5 to 20 and the length rate of the fibrillated portion of 5 to 10%. In contrast, in Example 3 with the screw configuration changed to the high-shear type, the fiber was sufficiently fibrillated in the melted resin resulting in the aspect ratio of 900 to 1,000 and the length ratio of the fibrillated portion of 40 to 50%. For Example 2 and Example 3, the elastic modulus and the impact test both had no problem same as those of Example 1. For example, it was confirmed that a highly strengthened resin was able to be acquired when the minimal diameter/maximal diameter to be the fiber diameter ratio of one fiber was 1/500 to 2/3, the fiber was bent at an angle of the right angle or larger, the aspect ratio of the fiber was 5 to 1,000, the length rate of the fibrillated portion was 5 to 50%, and the diameter of the constituent fiber in the fibrillated portion was 1/10 or smaller of the diameter of the overall fiber.

In Example 4 with the pulp fiber changed to the pulp fiber that was caused to tend to be compatible with PP by completely hydrophobically modifying the softwood pulp by a silane coupling agent in advance, the compatibility between the fiber and PP was enhanced resulting in the state where the vacancies around the fiber was about 0.005% to be substantially absent. The stress tended to concentrate on the interface between the resin and the fiber when an impact is applied, resulting in the somewhat degraded impact resistance compared to other Examples.

In Example 5 with pulp changed to the pulp having large dispersion, that is, having a large difference in the fiber diameter ratio in one fiber by changing the lot of the pulp, the minimal diameter/maximal diameter to be the fiber diameter ratio of one fiber was about 1/600 to be very small. The fiber thereby tended to be broken at the point at which the fiber was thin when the injection molding was conducted, and the effect of the fiber enhancement was therefore degraded resulting in the degraded elastic modulus of 1.8 GPa.

In Example 6 with the screw configuration changed to only the feeding screw that applied substantially no shear, the partial fibrillation for the pulp was substantially not conducted and the rate of the length of the fibrillated portion was 0 to 4%. As a result, the elastic modulus of the composite resin molded article was reduced to 1.7 GPa.

In Example 7 with the screw configuration changed to the high-shear type and with the 10 sessions of the passage through the kneader, the fibrillation of the pulp was significantly advanced and the rate of the length of the fibrillated portion was 80 to 100%. The fiber thereby tended to be oriented when the injection molding was conducted and cracks were therefore generated in the drop impact test resulting in the degraded impact resistance.

In example 8 with the softwood pulp crushed in advance into powder, the aspect ratio of the overall fiber was 1 to 2. The elastic modulus was thereby reduced to 1.7 GPa resulting in the degraded strength.

In Example 9 using the pulp fiber whose fiber fibrillation was advanced by conducting the wet fibrillation process in advance for the softwood pulp, the aspect ratio of the fiber was increased to 1,000 to 2,000. The fiber thereby tended to be oriented when the injection molding was conducted and cracks were generated in the drop and impact test resulting in the degraded impact resistance.

In Example 10 without adding any maleic acid anhydride as the dispersing agent, the fiber and the PP were not compatible with each other and the volume of the vacancies around the fiber was about 70% of the volume of the fiber. As a result, the elastic modulus was thereby 1.8 GPa to be somewhat degraded compared to the other Examples.

In Comparative Example 1 with the change of the lot of the pulp to change to the pulp whose fiber diameter was substantially uniform, that is, substantially no difference was present in the fiber diameter ratio in one fiber, the minimal diameter/maximal diameter to be the fiber diameter ratio of one fiber was about 3/4 to be large. The fiber therefore tended to avoid bending and the bending angle of the fiber was 30 to 60 degrees to be smaller than the right angle. The impact resistance was thereby degraded resulting in splitting in the drop impact test.

In Comparative Example 2 with the pressure increased for the injection molding to cause the fiber to tend to be oriented in the flow direction, the fiber tended to avoid bending during the molding and the bending of the fiber was 60 to 80 degrees to be smaller than the right angle. The impact resistance was thereby degraded resulting in splitting in the drop impact test.

From the above evaluations, the fiber added in the composite resin molded article is bent at an angle of the right angle or larger in the resin, and the high impact resistance can thereby be realized. A proper fiber diameter difference was present in the one fiber, and the fiber thereby tends to be bent and the above structure tends to be realized. The molded article is produced using the resin material including the fiber whose fiber end portion alone is fibrillated, then, the high elastic modulus can be realized even when the aspect ratio is not so high, and the aspect ratio was not so high and the fiber thereby tend to avoid orientation when the injection molding is conducted. A composite resin molded article with high impact strength can therefore be realized.

The composite resin molded article according to the present disclosure can be produced as a molded article more excellent in the mechanical properties than those of a molded article using the traditional general-purpose resin. According to the present disclosure, the properties of the base resin can be improved and the base resin can therefore be used as a substitute of any engineering plastic or a substitute of any metal material. The production cost of each of various industrial products or the livingware made from an engineering plastic or a metal can significantly be reduced. In addition, the use is enabled for home appliance housings, construction materials, and automobile members.

EXPLANATIONS OF LETTERS OR NUMBERS 1 base resin
2 fibrous filler
3 fibrillated portion

What is claimed is:

1. A composite resin molded article comprising:
   a base resin; and
   a fibrous filler,
   wherein the fibrous filler is bent between one end side thereof and another end side thereof,
   wherein the angle of the bending is 90 degrees or larger, and
   wherein the angle of the bending is defined as an angle between an elongating direction before bending and an elongating direction after bending.

2. The composite resin molded article according to claim 1, wherein a fiber diameter of the fibrous filler differs along a longitudinal direction of the fibrous filler.

3. The composite resin molded article according to claim 1, wherein the fiber diameter of a thinnest portion of the fibrous filler is 1/500 to 2/3 of the fiber diameter of a thickest portion thereof.

4. The composite resin molded article according to claim 2, wherein the fibrous filler is bent in the thinnest portion.

5. The composite resin molded article according to claim 1, wherein a vacancy is present in an interface between the base resin and the fibrous filler, and
   wherein a size of the vacancy is 0.01% to 10% of a surface area of the fibrous filler.

6. The composite resin molded article according to claim 1, wherein an end portion of the fibrous filler was fibrillated.

7. The composite resin molded article according to claim 1, wherein the fibrous filler is a natural fiber.

8. The composite resin molded article according to claim 1, wherein the base resin is an olefin resin.

* * * * *